US006828373B2

(12) United States Patent
Artz et al.

(10) Patent No.: US 6,828,373 B2

(45) Date of Patent: Dec. 7, 2004

(54) WATER SOLUBLE TOOLING MATERIALS FOR COMPOSITE STRUCTURES

(75) Inventors: Gregory J. Artz, Tucson, AZ (US); John L. Lombardi, Tucson, AZ (US); K. Ranji Vaidyanathan, Tucson, AZ (US); Joseph Walish, Tucson, AZ (US)

(73) Assignee: Advanced Ceramics Research, Inc., Tuscon, AZ (US)

(*) Notice: Subject to any disclaimer, the term of this patent is extended or adjusted under 35 U.S.C. 154(b) by 96 days.

(21) Appl. No.: 10/092,843

(22) Filed: Mar. 6, 2002

(65) Prior Publication Data

US 2002/0173575 A1 Nov. 21, 2002

Related U.S. Application Data

(60) Provisional application No. 60/274,074, filed on Mar. 7, 2001.

(51) Int. Cl.[7] .................................................. C08K 5/15

(52) U.S. Cl. ....................... 524/492; 524/451; 524/493; 524/494; 524/536; 524/495; 524/496; 524/570; 524/547; 249/63; 249/175

(58) Field of Search ................................ 524/492, 451, 524/493, 494, 536, 495, 496, 570, 547; 249/63, 175

(56) References Cited

U.S. PATENT DOCUMENTS

| | | | | |
|---|---|---|---|---|
| 3,425,982 | A | 2/1969 | Fink | |
| 3,671,280 | A | 6/1972 | Smith | |
| 5,578,362 | A | 11/1996 | Reinhardt et al. | |
| 5,814,146 | A | 9/1998 | Maggio et al. | |
| 6,045,745 | A | 4/2000 | Reno | |
| 6,067,480 | A | 5/2000 | Stuffle et al. | |
| 6,070,107 | A | 5/2000 | Lombardi et al. | |
| 6,325,958 | B1 * | 12/2001 | Lombardi et al. | 264/86 |

OTHER PUBLICATIONS

European Search Report mailed May 7, 2004.

* cited by examiner

*Primary Examiner*—William K. Cheung

(57) ABSTRACT

The present invention relates to a low density, water-soluble coring and tooling material used for the fabrication of composite parts. One aspect of the present invention relates to a lightweight, strong composite coring material that can be easily shaped and removed from cured composite parts. Another aspect of the present invention relates to a lightweight, strong composite tooling material that is easily tailored to provide a specific coefficient of thermal expansion and thermal conductivity, thus providing a tooling material that can be matched to the composite structure and material being fabricated.

6 Claims, 2 Drawing Sheets

WATER SOLUBLE TOOLING MATERIALS FOR COMPOSITE STRUCTURES

CROSS REFERENCE TO RELATED APPLICATIONS

This application is based on, and claims the benefit of, U.S. Provisional Application Ser. No. 60/274,074, filed on Mar. 7, 2001, and entitled "Water Soluble Tooling Material For Composite Structures."

The present invention was made with U.S. Government support under grant Number N68335-01-C-0053 awarded by the Naval Air Warfare Center. Accordingly, the Government may have certain rights in the invention described herein.

FIELD OF THE INVENTION

The present invention relates to a novel coring and tooling material for polymer composites. Particularly, the present invention relates to a low-density, water-soluble composite blend used to form a core material for the fabrication of composite parts. In addition, the present invention relates to a low density, water-soluble composite blend used to form a tooling material, where the blend can be tailored to provide a desired coefficient of thermal expansion and thermal conductivity, thus providing a tooling material that is compatible with the composite material used to fabricate the structure.

BACKGROUND OF THE INVENTION

Composite components are increasingly being utilized in a variety of applications due to their high strength-to-weight and high stiffness-to-weight ratios. One industry in which composite components are used is the aerospace industry. Initially, composite components were limited to secondary structures such as floorboards and engine cowlings due to limited experience with designing composite structures. However, as the mechanics of composite materials became better understood and higher quality materials were developed, their use increased as primary aircraft components such as flaps, wing sections, and even as the entire fuselage.

Currently, there exist commercial aircraft that have a completely composite fuselage and wings made entirely from composite materials. Commercial airline manufacturers have increased their dependence upon composite materials to meet their ever-increasing demands for improved efficiency and lower costs. Composite materials also are used in military and defense applications, where the performance requirements may be even more demanding. A significant drawback to the use of composite structures in aerospace applications, whether commercial or military, is the complicated and expensive tooling that is required for their fabrication. Many different processes exist for the fabrication of composite structures, and many different demands are placed upon tooling designs and materials. Typically, a composite structure is fabricated using either a closed or an open mold system. In a closed mold system, dimensional accuracy is required for both sides of the composite component. A composite structure of this type would be, for example, an aileron or flap, of sufficient thickness to allow the desired aerodynamic shape to be formed on both sides. Alternatively, an open mold process can be utilized to fabricate parts such as engine cowlings because only one surface, the outer surface (thus, the mold surface), is of importance. With either mold system, the tool gives the composite structure its final shape.

Tools for composite structures can be fabricated from a variety of materials. However, several factors must be considered in the tool design. For instance, the coefficient of thermal expansion of the mold material is of fundamental importance. As the tool is heated, it may change shape at a different rate than the composite materials if the coefficients of the tool and composite material are not similar enough. At elevated temperatures the composite material becomes rigid, whereas, when it is cooled, it will contract. The difference in the coefficient of thermal expansion of the composite and of the tool can create geometrical inaccuracies as well as residual stresses.

Another important factor to consider is the thermal conductivity of the tool material. If the tool material has a low thermal conductivity, significant time can be spent simply getting sufficient heat to the composite part. Thus, curing irregularities can develop between areas of thick and thin tooling. These irregularities also translate into geometric inaccuracies and residual stresses.

Given these restrictions, tools for composite structures are most often comprised of steel, invar, aluminum, and carbon/BMI. With the exception of invar and carbon/BMI materials, the tooling materials generally have a much higher coefficient of thermal expansion than the composite material being fabricated, and this expansion must be accounted for in the mold design. Also, metal mold materials generally require complex and time-consuming machining operations in order to create the tool surface, which further contributes to design complexities. For larger components, the time required to generate the surface of the tool can become unacceptable. Additionally, it can be very difficult to make any modifications to metal tooling once made, if changes to a part are subsequently identified. Thus, if part changes are required, it is often easier to make new metal tooling rather than attempt to re-work the original tooling.

Although composite-tooling materials may seem ideal due to the matched coefficient of thermal expansion, such tooling requires another complex composite component fabrication cycle for the tool itself. Furthermore, a higher processing temperature for the composite structure requires higher cure temperatures for the tool material. Generally, this results in the use of thermoplastic tooling systems that are difficult and expensive to work with.

Use of mandrels made of polymeric binder compositions to form rocket motors, housings and other uniquely shaped items is known. For example, U.S. Pat. No. 6,325,958, which is incorporated by reference herein, discloses methods of manufacture of a mandrel from a mixture that includes water-soluble organic binders. More specifically, the preferred binder comprises, poly (2-ethyl-2-oxazoline), derivatives of poly (2-ethyl-2-oxazoline) and mixtures thereof, along with polyvinylpyrrolidone, derivatives and copolymers of polyvinylpyrrolidone and mixtures thereof. Poly (2-ethyl-2-oxazoline), also referred to as "PEO" or "PEOx," tends to be a relatively high cost component. Additionally, the functional properties of PEOx, such as its glass transition temperature, may not be compatible with certain composite formulations for the parts made using the mandrels.

Other conventional materials used for making tooling such as mandrels include eutectic salt, sodium silicate-bonded sand, and poly(vinyl alcohol) bonded ceramic microspheres. These materials pose certain processing problems associated with removal of the materials from the cured parts, as well as with the disposal of the materials. Eutectic salt mandrels are heavy ($\rho>2$ g/cc) and have high lineal thermal expansion ($\alpha > 6 \times 10^{-5} K^{-1}$). Furthermore, salt mandrels are brittle and must be cast into the desired shape while molten to avoid machining them with diamond tooling. Despite being soluble in water, eutectic salt mandrels produce corrosive, environmentally unfriendly waste streams when washed from the cured composite part. Sodium silicate-bonded sand mandrels are readily washed from the cured composite and do not produce corrosive waste streams. Unfortunately, silicate-bonded mandrels are heavy and brittle, making them difficult to machine without resorting to diamond tooling. Mandrels made from ceramic microspheres bonded together by poly(vinyl alcohol) have low densities and form relatively easily but have a limited range of temperatures between which they can be used, because poly(vinyl alcohol) polymer binder becomes crosslinked above 200° C., making it difficult to wash the mandrel from the cured part.

Thus, there remains a need for compatible, cost-effective, water-soluble compositions for use as coring and tooling materials in the fabrication of composite parts.

SUMMARY OF THE INVENTION

The present invention offers alternative coring and tooling system and materials. The present invention offers novel low-cost coring and tooling materials for composite parts. Unlike conventional coring and tooling materials, the materials of the present invention are readily soluble in water and can easily be washed away from the finished part. Furthermore, the coring and tooling materials can be used in the manufacture of a wide range of composite parts that can be cured at higher temperatures than heretofore possible.

Accordingly, an object of the present invention is to provide a composite coring and tooling material that is cost-effective, environmentally benign, and water-soluble.

Another object of the present invention is to provide coring and tooling materials that can be easily shaped and subsequently removed from cured composite parts.

Yet another object of the present invention is to provide composite coring and tooling materials that are strong and lightweight yet capable of withstanding high curing temperatures.

Furthermore, an object of the present invention is to provide tooling materials that can be tailored to provide a specific coefficient of thermal expansion and thermal conductivity, thus providing tooling materials that can be matched to the composite structure being fabricated.

DETAILED DESCRIPTION OF THE INVENTION

The present invention relates to novel water-soluble coring and tooling materials that can be used as forms in the fabrication of composite parts, particularly those having complex geometries. The materials are lightweight, environmentally benign, and water-soluble, and the cost of the bulk starting materials is low. Composite parts fabricated with the coring and tooling material have a wide range of applications, such as automobile, aerospace, and biomedical prosthesis.

Figure 1:
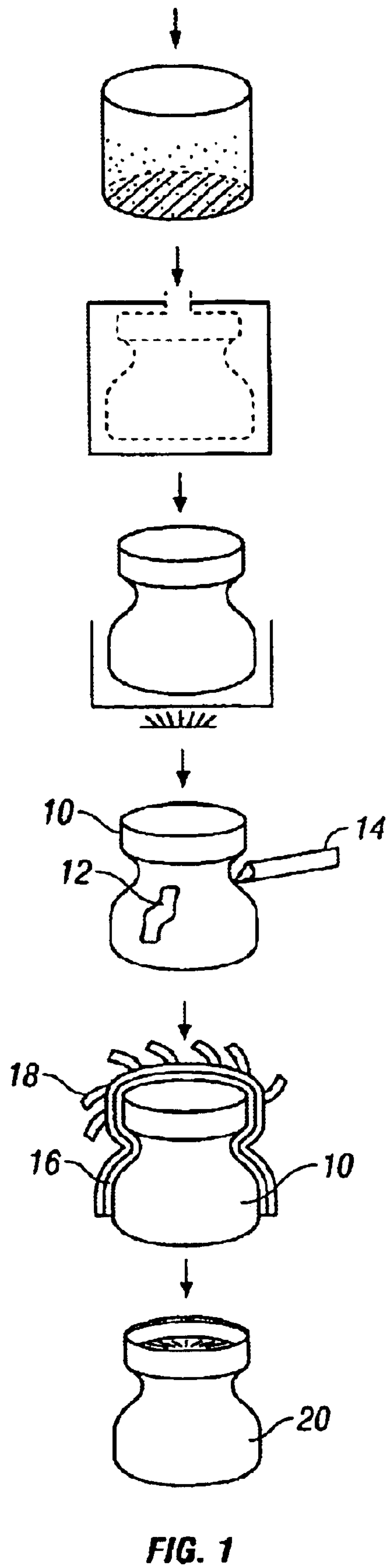
FIG. 1 is a schematic flow chart illustrating the steps in the manufacture of a composite part in accordance with the present invention.

Referring to FIG. 1, there is illustrated a process for making tooling material from a composite blend. Once formed, the tooling material then can be used in the manufacture of composite parts. As used herein, "tooling material" relates to any structure used in the fabrication of composite parts, such as a mandrel or core form, where the structure provides a support matrix for the composite part as it is being fabricated. For example, the tooling material may be used as an internal core around which the part is formed. As another example, the tooling may be used as an external mold within which the part is formed.

In an initial step in the process, the composite blend used for the tooling material is provided. Generally, the composite blend includes a polymeric binder, water and, optionally, one or more additives selected to modify the physical properties of the binder and enhance the characteristics of the finished tooling material. The components are added to prepare a blend having a desired consistency. For example, the composite blend can be prepared as a slurry or as a paste, depending on the methods selected for forming the tooling material and the properties desired for the finished tooling material.

The polymeric binder of the composite blend preferably is a water-soluble thermoplastic binder having high thermal stability. Water-soluble polymers such as polyvinylpyrrolidone, which is also sometimes referred to as polyvinylpyrrolidinone, (PVP) and blends or copolymers thereof can be used as the thermoplastic binder. Preferably the binder is PVP. PVP has a relatively high glass transition temperature (Tg). For example, the glass transition temperature of PEO is about 65° C., whereas the glass transition temperature of PVP is about 190° C. The higher Tg increases the resistance of the dried tooling material towards slumping at higher curing temperatures, which could otherwise cause dimensional inaccuracies in the cured composite part. It thus is possible to use the PVP-based tooling materials in the fabrication of a wide range of composite parts.

In preparing the composite blend, the thermoplastic binder is mixed with water to provide a solution. Additives can be mixed with the solution as desired to provide the composite blend. Additives can include microspheres, plaster, metal particles, polyester or polypropylene fibers, graphite and/or coke particles, compatibilizers such as alkali lignosulfonate, and mixtures thereof, which are selected to enhance the functional properties of the tooling material.

The microspheres may be organic solids, metal or ceramic microspheres, or combinations thereof. Ceramic and metallic microspheres are preferred. The microspheres may be hollow or solid and are intended to be small particles. Typically, the size of the microspheres is between about 10 to about 200 microns, although materials outside of this range are anticipated for use in the practice of the present invention. One suitable microsphere that can be used is commercially sold under the name Extendospheres® SLG Grade microspheres by PQ Corporation, Valley Forge, Pa. These microspheres are hollow ceramic microspheres with a mean sphere diameter of about 120 micrometers. The microspheres serve as a lightweight, low-density filler constituting the major phase of the tooling material.

A material such as plaster can be used in the composite blend to improve the castability of the blend when making the tooling material. The types of plaster that may be used include plaster of paris and gypsum plaster. Talc or similar material also can be added as a filler to the composite blend to slow the rate of hardening of the composite blend.

Metallic or high thermal conductivity ceramic fillers can be added to enhance the thermal conductivity of the composite blend. Examples of high conductivity ceramic fillers include graphite, alumina, and silicon carbide. Various metallic powders having high thermal conductivities and low coefficients of thermal expansion can be used. Aluminum is one example of such a metallic filler. Aluminum flakes, aluminum tadpoles, and aluminum needles may serve as an aluminum filler. Generally, the type of particle selected will impact the amount of metallic filler that can be added to the blend. By way of example, it is expected that a greater amount of aluminum tadpoles could be added as compared to aluminum flakes.

Polyester or polypropylene fibers can be blended with the polymer binder to enhance the compressive strength of the tooling material, particularly when higher curing temperatures are anticipated. With increasing temperatures and exposure times for curing of the composite parts, it is desired to monitor the compressive strength of the tooling materials to avoid any undesired decreases in the compressive strength that could result in distortion of the geometry of the part. Any suitable type and form of polyester or polypropylene fiber that is compatible with the binder and the composite part can be used. Examples include chopped polyester or polypropylene or other types of synthetic fibers. Preferably, polypropylene fibers are used.

Graphite and coke can be added to the composite blend to increase the thermal conductivity of the tooling materials. Examples of graphite particles include Type 4012 and Type A625 graphite from Asbury Graphite, Asbury N.J. Examples of coke include needle coke, such as Type 9019 from Superior Graphite Company, Chicago, Ill., and fluidized coke, such as Grade 4349 from Asbury Graphite, Asbury, N.J.

Addition of inorganic fillers typically requires use of compatibilizers or dispersants to maintain the particles in suspension in the composite blend. Lignosulfonates are well known dispersants for a wide variety of inorganic fillers. Furthermore, their high phenolic content enables them to readily form miscible blends with PVP due to strong hydrogen bonding interactions present between the phenolic hydroxyl group and the amide carbonyls present in the PVP polymer backbone. Use of compatibilizers or dispersants may provide the added benefit of increasing the glass transition temperature of the composite blend. Cross-linking of the dispersant and the polymer binder may result in such an increase. It is expected that even a 5–10° C. increase in Tg can result in a substantial enhancement of the heat stability of the tooling materials.

The blend can be a pourable slurry, moldable clay-like paste, or even a solid. For a slurry, the viscosity ranges from between about $10^5$ to about $10^7$ centipoise (cP) at room temperature. Moldable clays typically have viscosities of at least two orders of magnitude higher compared to pourable slurries. The composite blend is placed into a mold form so that it may be cast. The mold form typically includes means of de-watering the composite blend. For example, the mold form may be configured to allow water to drain from the composite blend. That is, the mold form may have a screen along a bottom surface so that de-watering is effected by draining water through the screen, either by gravity or by application of a partial vacuum.

The de-watered tooling material is removed from the mold form and subjected to a drying operation. The drying can be carried out in any drying oven at a temperature between about 100 to about 125° C. for a time sufficient to provide the desired degree of drying, which will vary with the thickness of the tooling material. A preferred drying cycle consists of drying between about 100 to about 125° C. for one hour for each inch of thickness of the material. If additives such as microspheres are used in the composite blend, the binder material adsorbs onto the additives during the drying process, as well as possibly during the prior blending step.

In an important aspect, the tooling material requires no complex processing in order to make mold having the desired shape. The tooling material can be cast around a master part to create either an open or closed mold. The tooling material also can be machined into the desired form. Use of a combination of both methods also is possible.

The tooling material 10 is finished to obtain the desired shape. The tooling material 10 undergoes a minimal amount of shrinkage as the material cures. Once the tooling material surface has been achieved, the surface finish can be repaired or polished using traditional techniques, as desired. Cracks or other undesired features in the surface may be smoothed over using a finishing composition 12 that is water soluble and will not alter the properties of tooling material when used subsequently in fabricating the composite parts. Preferably, the finishing composition includes a polymer binder and plaster. The finishing composition also can include polyester or polypropylene fibers. Preferably, the finishing composition includes between about 2 to about 10% PVP or PVP copolymer, between about 25 to about 50% plaster of paris and/or talc, between about 25 to about 50% water, and between about 0 to about 2% polyester or polypropylene fibers. The finishing composition preferably will have a more viscous consistency so that it can be applied to the outer surface of the tooling material and will adhere to the outer surface without spreading or running off the surface. The viscosity of the composition is between about $10^6$ to about $10^7$ cP.

The material will also have a consistency that is amenable to machining with conventional tooling 14 as known to those of skill in the art. As an example, the machining may be accomplished with a lathe or milling machine using carbide tooling, preferably at slower cutting speeds.

Preferably, the porosity of the dried tooling material is between about 5 to about 15%. If the porosity of the tooling materials is greater than desired, a water-soluble sealant also can be applied to the outer surface of the tooling materials once formed. The sealant will limit migration of resin from the composite part into the tooling material. As an example, the sealant can include between about 10 to about 15 wt % PVP, between about 55 to about 65 wt % water and between about 20 to about 30 wt % latex paint conditioner.

The finished tooling material then can be used in the manufacture of a molded composite product. For example, in the manufacture of a mandrel, the molded core 10 of FIG. 2 may have an optional coating or insulation 16 applied to the outer surface. A ribbon of fiber material epoxy coating 18 may be wound on the molded core 10 to assume the shape of the core 10 and form the composite product 20. The molded epoxy coating casing 20 is cured, for example, by application of heat or light. It is noted that when using the cores of the present invention, it is possible to heat the epoxy coating to temperatures of at least about 550° F. without significant degradation of the core 10.

In an important aspect, the tooling materials are soluble in water. With water-soluble tooling materials, the core 10 can be removed by flushing the core 10 with a solvent, preferably water. The water breaks down the core materials into the components of the blend, namely the binder, which is water soluble, and any additives. The core 10 thus may be removed from the engine casing 20. It is possible to obtain tooling materials that remain soluble in water even after exposure to temperatures of 550° F. or greater.

When the mold material is incorporated into the composite structure, features like channels, recesses, integral stiffeners and hollow sections can be created with the mold material. Upon curing of the final composite part, the mold material in the channel or recess of the final part can simply be washed out, leaving the proper part geometry.

There are numerous advantages associated with the construction as described. For example, the materials are safe and easy to use because the binder is water soluble. The blend provides increased heat stability and creep resistance for the tooling materials. Additionally, the blend exhibits enhanced thermal conductivity and lower thermal expansion and generally will maintain the density of the tooling material upon heating.

EXAMPLES

The following examples further illustrate preferred embodiments of the present invention but are not be construed as in any way limiting the scope of the present invention as set forth in the appended claims.

Example 1

This example illustrates a composite blend for use as a core form for the fabrication of composite parts. The coring material includes a composite blend of hollow ceramic-microballons and a high thermal stability thermoplastic binder. In preparing the composite blend, the thermoplastic binder is mixed with water to form a first solution. The first solution is subsequently mixed with a ceramic micro-sphere filler to provide a composite blend in the form of a moist, formable paste. The paste can be shaped and dried in a drying oven at between about 100 to about 125° C. for about 1 hour per inch of thickness. The dried paste form can be subsequently machined as desired, thereby producing a mandrel or core having a desired configuration. Examples of composite blends containing PVP and ceramic microsphere filler are shown in Tables 1 and 2.

TABLE 1

| | Wt. (lbs.) | Wt. % |
|---|---|---|
| **Solution** | | |
| PVP K90 | 0.24 | 15% |
| Water | 1.4 | 85% |
| Total | 1.60 | 100% |
| **Paste** | | |
| Solution | 1.60 | 20% |
| Extendospheres SLG | 6.40 | 80% |
| Total | 8.00 | 100% |

TABLE 2

| | Wt. (g.) | Wt. % |
|---|---|---|
| **Solution** | | |
| PVP | 14.06 | 15% |
| Water | 79.7 | 85% |
| Total | 93.75 | 100% |

TABLE 2-continued

| | Wt. (g.) | Wt. % |
|---|---|---|
| **Paste** | | |
| Solution | 10.00 | 20% |
| Ceramic microspheres | 40.00 | 80% |
| Total | 50.00 | 100% |

Mandrels formed from the composite blend were fabricated by pressing the moist, formable paste into a molded shaped, drying the shaped part for 24 hours, sealing the dried part with silicone and further drying the part for 3 days. These mandrels were then used in an autoclave run as a preform. In the autoclave run, a S2/8551 glass/epoxy prepreg was used. A 15 psi vacuum, and an external pressure of 100 psi, was used, with the curing performed at 250° F. for 1 hour and 350° F. for 3 hours.

In a temperature range between 25° C. to 180° C., samples prepared from the composite blend shown in Tables 1 and 2 were measured to have a coefficient of thermal expansion of 5x10-6 mm/mm° C. However, slight shrinkage in the size of the samples occurred in a temperature range from between room temperature to 180° C. In order to eliminate shrinkage and obtain dimensional stability in the samples, the sample can be subjected to an annealing treatment at the final cure temperature. For example, the samples were annealed at 190° C. for 1 hour. After annealing, samples prepared from the composite blend shown in Tables 1 and 2 were measured to have a coefficient of thermal expansion of −1.04x10-6 mm/mm° C.

Example 2

This example illustrates a composite blend for use as a tooling material for fabrication of composite parts. The tooling material comprises a composite blend having a high thermal stability thermoplastic binder and either metal filler or high conductivity ceramic filler. The metallic or ceramic fillers used in the composite blend increase the overall thermal conductivity of the blend, and thus, provide a tooling material that can be tailored to provide specific values of thermal expansion and heat transfer. Conventional tooling materials, although inexpensive, are inferior due to their inability to have tailored coefficient of thermal expansion and thermal conductivity.

High conductivity ceramic fillers, such as graphite, alumina, and silicon carbide, can be used in the present invention. Tables 3 and 4 illustrate composite blends containing PVP and graphite powder. Note, composite blends having graphite powder as the ceramic filler require dispersants for the graphite powder.

TABLE 3

| | Solution 1 | |
|---|---|---|
| | Wt. (g.) | Wt. % |
| PVP K90 25% & Water | 60.00 | 25% |
| Water | 180.00 | 75% |
| Total | 240.00 | 100% |

TABLE 3-continued

| Material | Vol. % | Density | Wt. % | Weight |
|---|---|---|---|---|
| | Batch Size: 1900 cc | | | |
| | Solution 2 | | | |
| Water | 10.00% | 1.00 | 10.37% | 190.00 |
| Lignosulfonate | 0.25% | 1.00 | 0.26% | 4.75 |
| Graphite Spheres | 89.75% | 0.96 | 89.37% | 1637.04 |
| Total | 100.0% | | 100% | 1831.79 |
| | Paste | | | |
| Solution 1 | 12.00% | 1.00 | 12.2% | 228.00 |
| Solution 2 | 88.00% | 0.98 | 87.8% | 1638.56 |
| Total | 100.0% | | 100% | 1866.56 |

TABLE 4

| | Solution 1 | | | |
|---|---|---|---|---|
| | Wt. (g.) | Wt. % | | |
| PVP & Water | 50.00 | 25% | | |
| Water | 150.00 | 75% | | |
| Total | 200.00 | 100% | | |
| | Batch Size: 1900 cc | | | |
| Material | Vol. % | Density | Wt. % | Weight |
| | Solution 2 | | | |
| Water | 10.00% | 1.00 | 4.7% | 190.00 |
| Dispersant | 0.25% | 1.00 | 0.1% | 4.75 |
| Graphite Spheres | 89.75% | 2.25 | 95.2% | 3836.81 |
| Total | 100.0% | | 100% | 4031.56 |
| | Paste | | | |
| Solution 1 | 12.00% | 1.00 | 6.4% | 228.00 |
| Solution 2 | 88.00% | 2.00 | 93.6% | 3344.00 |
| Total | 100.0% | | 100% | 3572.00 |

In preparing the composite blends disclosed in Table 3 and 4, a first solution is formed by mixing the thermoplastic binder with water. The first solution is subsequently mixed with a second solution containing water, dispersant, and graphite powder. When mixed together, the first and second solutions form a moist, formable paste. The paste can be shaped to form a tool mold having a desired configuration.

In a temperature range between 100° C. to 180° C., samples prepared from the composite blend shown in Tables 3 and 4 were measured to have a coefficient of thermal expansion of 9x10-6 mm/mm° C. However, slight shrinkage in the size of the samples occurred in a temperature range from between room temperature to 180° C. In order to eliminate shrinkage and obtain dimensional stability in the final tool mold, the tool mold can be subjected to an annealing treatment at the final cure temperature. For example, the samples were annealed at 190° C. for 1 hour. After annealing, samples prepared from the composite blend shown in Tables 3 and 4 were measured to have a coefficient of thermal expansion of 1.81x10-6 mm/mm° C. The coefficient of thermal expansion of Invar, a conventional tooling material, is reported to have a coefficient of thermal expansion of 1.3x10-6 mm/mm° C. at 23° C. As indicated, samples prepared from the composite blend shown in Tables 3 and 4 have a coefficient of thermal expansion that is comparable to Invar, while having a density of that is one order of magnitude less.

Example 3

Figure 2:
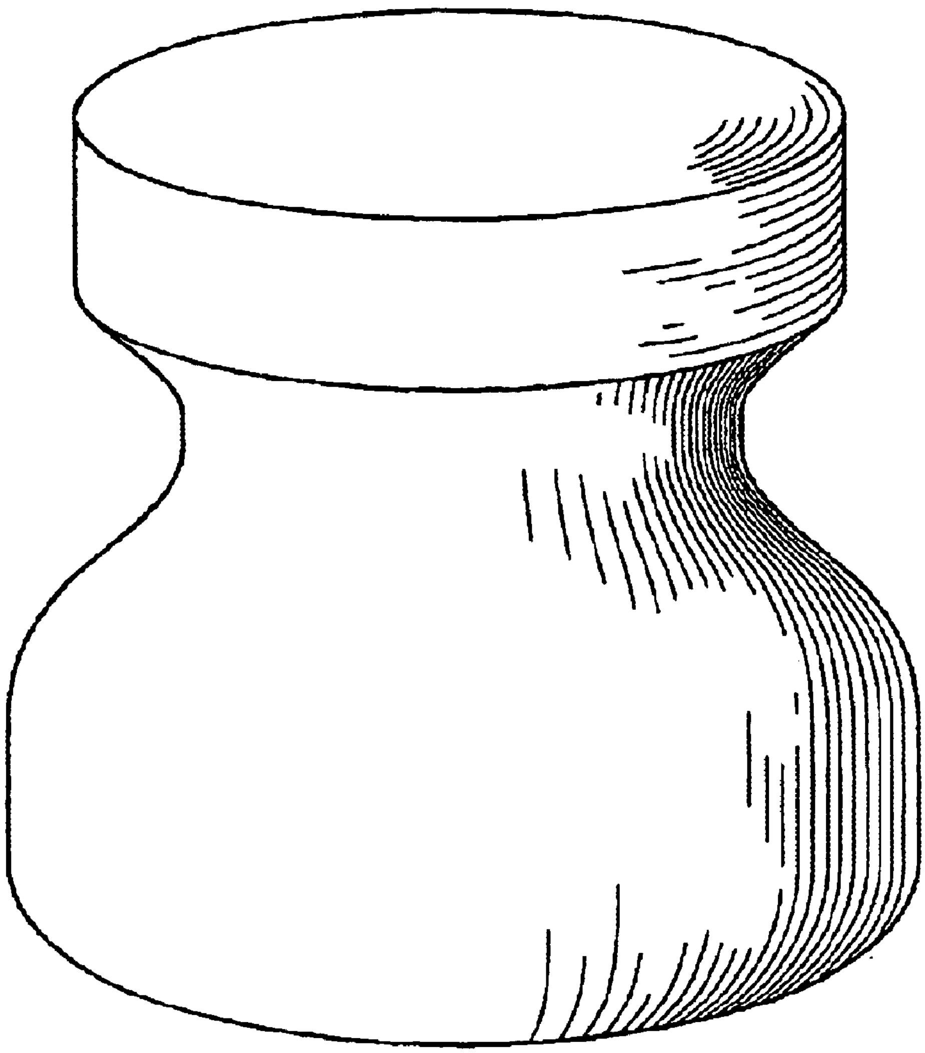
FIG. 2 is a plan view of a mandrel made in accordance with the process of FIG. 1.

This example illustrates formation of a mandrel and its ability to be machined. A mandrel, as shown in FIG. 2, has a specific gravity of 0.3 (dry) and 0.8 (wet). The important properties are shown in Table 5.

TABLE 5

| Property | Value |
|---|---|
| Compressive Strength | approximately 700–1000 psi |
| Density | 28.1 lbs/ft$^3$ (wet) |
| | 23.1 lbs/ft$^3$ (dry) |
| Coefficient of Thermal Expansion | $6 \times 10^{-6}$ in/in ° C. |

Example 4

This example illustrates a formulation that is castable and has a shelf life of approximately 30–45 minutes. This formulation is supplied in powder form. A typical formulation is shown in Table 6. As shown in Table 6, the formulation contains relatively little binder to provide a less-moisture sensitive formulation. The formulation is mixed with water in a 3:2 ratio and cast into molds A CTE measurement showed a value of approximately $5\times10^{-6}$ mm/mm° C. The density of this formulation, 31.8 lbs/ft$^3$, was higher than the formulation used in Example 3.

TABLE 6

| | Wt. (g.) | Wt. % |
|---|---|---|
| Plaster of Paris | 92.50 | 37.00% |
| Ceramic microspheres | 150.00 | 60.00% |
| PVP | 7.50 | 3.00% |
| Total | 250.00 | 100.00% |

Example 5

This example illustrates use of graphite/coke particles in the composite blend. An optimization of the graphite/coke particle sizes and their distributions was undertaken to improve the thermal conductivity of the water-soluble formulations. A compatibilizer was used to improve the dispersion of the graphite particles in water and resin.

The composite blend includes about 3 wt % PVP, about 39.55 wt % graphite particles, about 39.55 wt % coke particles, about 0.9 wt % lignosulfonate, and about 17 wt % water. Equal amounts of 44 µm graphite and 450 µm needle coke are used, where these are individual particle sizes. The individual particle size distributions for the graphite and coke are as follows:

~44 µm Graphite (Type 4012 and Type A625 from Asbury Graphite)
61.4%<44 µm
26.4%>44 µm
12.0%>75 µm
0.2%>150 µm ~450 µm Needle Coke (Type 9019 from Superior Graphite Co.)
2.78%<150 µm
1.97%>150 µm
13.32%>180 µm 37.95%>250 μm
43.59%>425 μm
0.39%>850 μm Numerous modifications and variations may be made in the techniques and structures described and illustrated herein without departing from the spirit and scope of the present invention. Thus, modifications and variations in the practice of the invention will be apparent to those skilled in the art upon consideration of the foregoing detailed description of the invention. Although preferred embodiments have been described above and illustrated in the accompanying drawings, there is no intent to limit the scope of the invention to these or other particular embodiments. Consequently, any such modifications and variations are intended to be included within the scope of the following claims.

What is claimed is:

1. A material system for preparing a mold core used in the fabrication of composite parts comprising:

a matrix composition for forming the mold core, the matrix composition comprising a water soluble thermoplastic binder selected from the group consisting of polyvinylpyrrolidone, copolymers of polyvinylpyrrolidone, and combinations thereof; and a finishing composition for smoothing an outer surface of the mold core by covering any undesired surface contours or cracks on the outer surface, the finishing composition comprising a water soluble thermoplastic binder and a hardening compound.

2. The material system of claim 1, wherein the matrix composition includes an additive selected from the group consisting of microspheres, hardening compounds, talc, metal particles, polyester fibers, polypropylene fibers, graphite particles, coke particles, compatibilizers, dispersants and combinations thereof.

3. The material system of claim 1, wherein the mold core has a porosity of between about 5 to about 15%.

4. The material system of claim 1, wherein the matrix composition includes about 3% thermoplastic binder, about 79.1% graphite and coke particles, about 0.9% compatibilizer and about 17% water all based on the weight of the composition.

5. The material system of claim 1, wherein the finishing composition includes between about 2 to about 10% water soluble thermoplastic binder based on the weight of the composition and between about 25 to about 50% hardening compound based on the weight of the composition.

6. A composite blend for preparation of tooling materials for fabricating composite parts consisting essentially of:

polyvinylpyrrolidone, copolymers of polyvinylpyrrolidone, and combinations thereof; and an additive composition for enhancing the functional properties of the blend selected from the group consisting of polymeric microbeads, ceramic microbeads, metallic microbeads, hardening compound, talc, polyester fibers, polypropylene fibers, metallic fillers, ceramic fillers, compatibilizers, dispersants, and combinations thereof.

* * * * *